June 2, 1959      G. H. MOORE      2,889,275
ELECTRONIC FLUID TREATMENT METHOD AND APPARATUS
Filed June 18, 1956      2 Sheets-Sheet 1
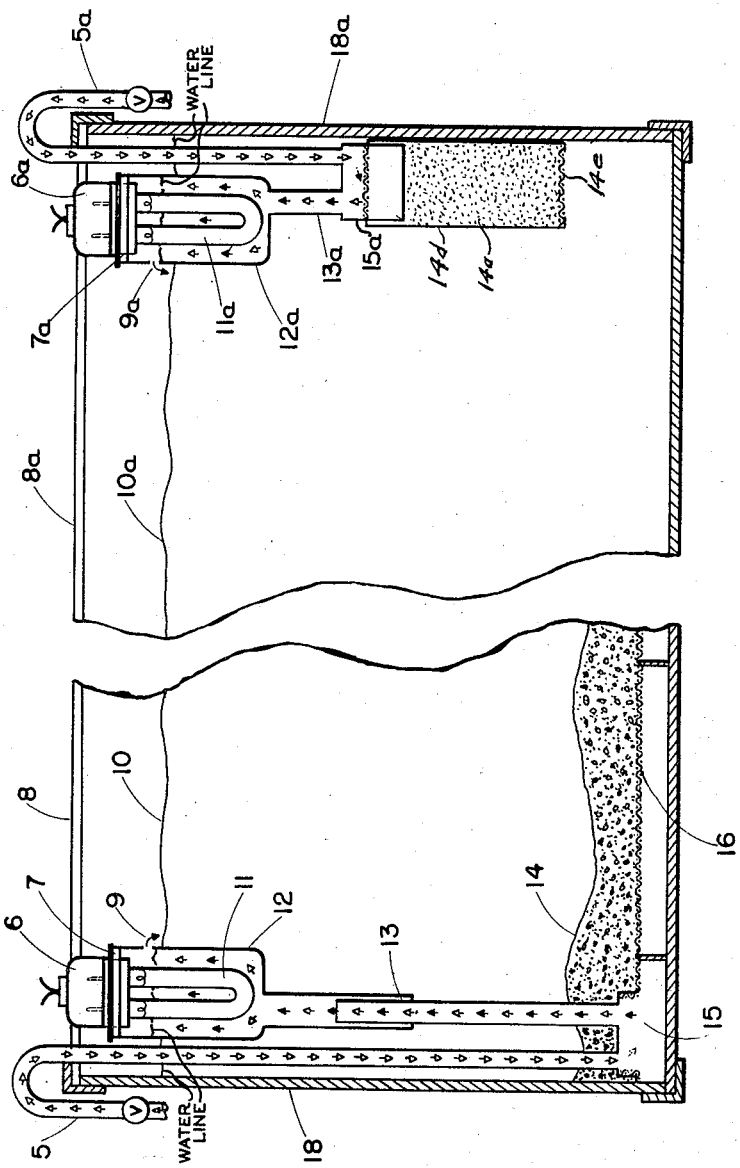
INVENTOR.
GEORGE H. MOORE
BY
Donald G. Eaton
AGENT June 2, 1959          G. H. MOORE          2,889,275
ELECTRONIC FLUID TREATMENT METHOD AND APPARATUS
Filed June 18, 1956          2 Sheets—Sheet 2
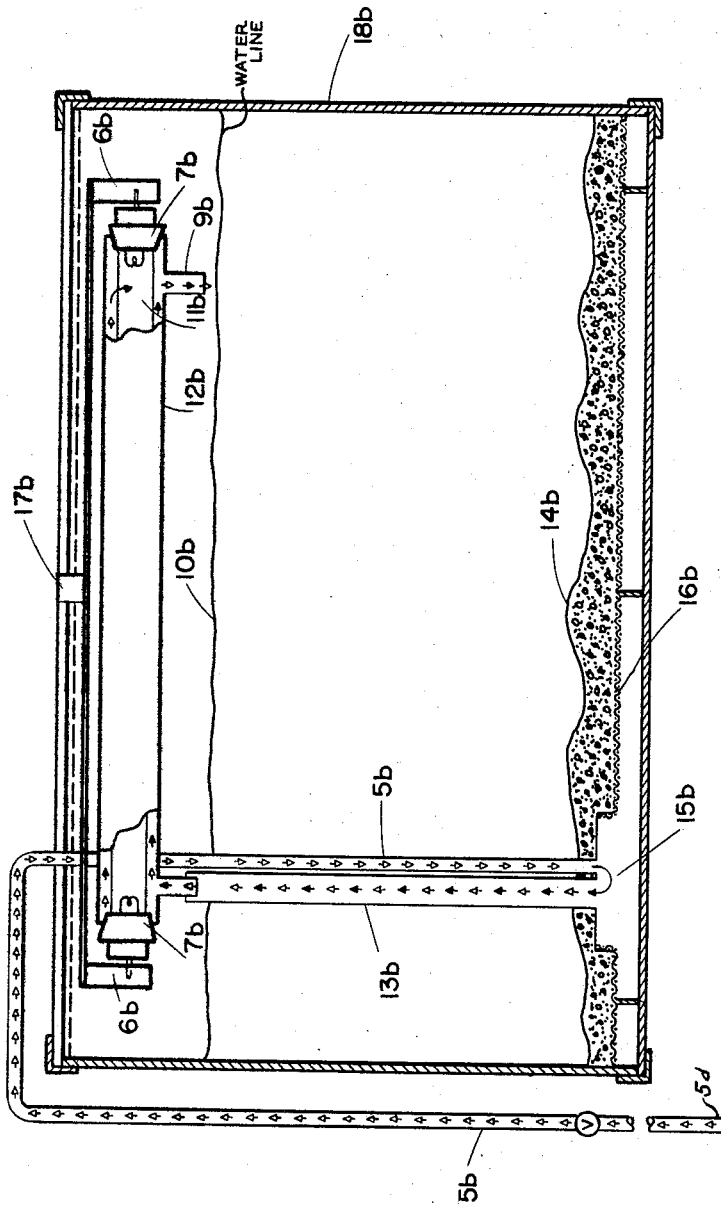
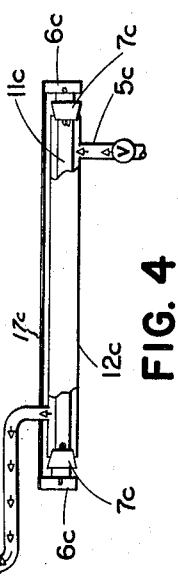
INVENTOR.
GEORGE H. MOORE
BY
*Donald G. Eaton*
AGENT

United States Patent Office 2,889,275
Patented June 2, 1959

2,889,275

ELECTRONIC FLUID TREATMENT METHOD AND APPARATUS

George H. Moore, Corona, Calif.

Application June 18, 1956, Serial No. 591,841

9 Claims. (Cl. 210—18)

This invention relates to fluid treatment and more specifically to a method and apparatus for electronically treating static bodies of water in order to maintain a substantially constant biological and germinal balance therein.

As is well known, static bodies of water, such as are found in aquariums, other containers, or in nature, contain bacteria, protozoa, and other micro-organisms in varying degrees. Certain types of such germ life in restrained numbers are extremely helpful in maintaining the purity of the water by converting waster and other forms of foreign matter into organic salts or other substances by biological conversion. However, all germ life is harmful if left unrestrained to multiply in copious quantities to saturate the aquarium water and in which case, the water becomes seriously contaminated thereby resulting in several undesirable conditions and in the case of aquariums, many times resulting in the actual death of the fish and other aquatic life therein. Some of the undesirable effects or conditions resulting from excessive bacteria in the water are: Cloudy or milky water caused by excessive germinal life. Green water caused by super-abundant small floating plants of the algae family. Fungus, a fuzzy, white, parasitic plant, which, if unchecked, will eventually consume fish present in the water. A variety of other water-borne parasites of which Ichthyophtirius ("Iche") is the most common. Furthermore, unrestrained multiplication of bacteria in water may result in the same becoming toxic and also will tend to promote the production or generation of odorous gases in the water.

Needless to say, all of the above conditions are extremely undesirable, particularly in aquariums to be situated in the home, and consequently any method or apparatus which will result in materially reducing or entirely eliminating these undesirable conditions, represents a progressive step forward in the art.

While for convenience, this invention is described and shown in connection with an aquarium, it is to be understood, that both the method and apparatus of this invention are equally applicable to any static body of water, whether the same is found in a container or as a natural deposit of water and accordingly, it is to be understood, that the invention is not to be considered as limited to use in an aquarium, even though this may represent a particularly satisfactory and practical application of the invention.

It is accordingly an object of this invention to provide a method and apparatus for treating static bodies of water in order to maintain such water at an optimum state of purity, clarity and sterility in order to satisfactorily support fish and other desirable forms of aquatic life.

A further object of the invention is to provide a method and apparatus for treating static bodies of water in order to maintain a germinal balance and the biological content of such water substantially constant.

A still further object of the invention is the provision of a method and apparatus to treat static bodies of water in such a manner, so as to retain a sufficient concentration of germinal life therein to dispose of animal waster or other foreign matter in the water by biological conversion of such matter and at the same time, prevent undue multiplication of the germinal life therein by destroying the water-borne germ life subjected to treatment by the apparatus and method of this invention.

Another object of the invention is the provision of a method and apparatus for treating static bodies of water to maintain the biological and germinal balance therein substantially constant and including the use of germicidal energy preferably in the ultraviolet range for continuously treating a stream of water moving at a controlled rate in order to destroy the water-borne germinal life in such stream of water.

Another object of the invention is the provision of a method and apparatus for treating static bodies of water in order to maintain the biological and germinal balance therein substantially constant and utilizing a source of germicidal energy comprising a single electronic discharge tube, which tube provides ultraviolet energy at optimum wave lengths for destroying water-borne germ life and for producing ozone ($O_3$) to oxidize, sterilize and deodorize gases released from the water.

A still further object of the invention is the provision of a method and apparatus for treating static bodies of water to maintain a biological and germinal balance therein substantially constant and including the use of an inorganic or other mechanical type filter, as well as treatment of a moving stream of water by germicidal energy, while at the same time, using a supply of compressed air to induce a flow of water and with an ozone genator provided in the air supply.

Another object of the invention is the provision of a method and apparatus for treating static bodies of water to maintain the germinal balance therein substantially constant and in which a moving stream of water is subjected to germicidal energy radiation in which means is provided to prevent radiation of such germicidal energy exteriorly of the moving body of water.

A further object of the invention is the provision of a method and apparatus for treating static bodies of water to eliminate or substantially reduce the discoloration of such water caused by the presence of bacteria, algae, fungi or other forms of organic or micro-organic life therein and to minimize the generation and liberation of odorous gases produced in the water and, at the same time, maintain such water substantially non-toxic to fish and other aquatic life present in the water.

Further objects and advantages of the invention will be apparent from the following description taken in conjunction with the accompanying drawing wherein:

Fig. 1 is a fragmentary sectional view showing one form of the invention and incorporating an inorganic filter, as well as an airlift type pump and a water treating chamber in which an electronic discharge tube is suspended in the treating chamber and provides a source of germicidal energy;

Fig. 2 is a view similar to Fig. 1, but showing a different form of inorganic filter;

Fig. 3 a sectional view of an aquarium and showing a further modified form of water treating chamber, as well as a different form of electronic discharge tube for providing a source of germicidal energy; and Fig. 4 a side elevational view with parts broken away for greater clarity and showing an ozone generator which may be utilized in connection with an air supply for the airlift type pump utilized in the apparatus shown in the other views.

With continued reference to the drawing, there is shown in Fig 1, a tank or aquarium 18 of the type commonly utilized in the home and which tank may serve to receive a body of water which is normally static and the upper level of which is indicated by the water level line 10. The tank 18 may be provided with an upper framework 8 and a perforated false bottom 16 may be disposed in the bottom of the tank 18 and serve to support sand or other inorganic filter media 14 in the form of a bed and which provides a mechanical filter upon the passage of water therethrough. Passages in the false bottom 16 communicate with an airlift type pump 15 which may be supplied with air through an airline 5, the flow of such air being controlled by a valve, as indicated. While an airlift type pump is shown, it is to be understood, that any other suitable type of pump may be employed for the purpose of circulating water in the tank 18 through the mechanical filter 14 and the remainder of the treating apparatus.

The discharge outlet of the pump 15 is connected through a tube 13 to a water treating chamber 12, which, as shown, may be suspended from the upper frame 8 of the tank 18 in the water in such tank with the upper portion of the chamber 12 extending above the waterline 10. The chamber 12 may be formed of a suitable non-toxic plastic, glass, stainless steel or other suitable material and it is highly desirable, that this material be of such a type so as to prevent the passage of germicidal energy therethrough. It is further to be noted, that a slip joint is provided between the pump discharge tube 13 and the chamber 12, in order to permit adjustment of the chamber to accommodate different sizes of tanks and different depths of water. The sidewall of the treatment chamber 12 is provided with an outlet aperture 9 and it is to be noted, that this aperture is normally positioned, either at or slightly above the waterline 10 in the tank 18.

A suitable fitting 7 is received in the upper end of the water treating chamber 12 and this fitting serves to support a suitable U-shaped electronic discharge tube 11 which provides a source of germicidal energy within the treating chamber 12. Connected to the tube 11 is a suitable electrical connector 6 which serves to provide electrical energy to the discharge tube 11. It is to be noted, that the major portion of the discharge tube 11 is located below the water discharge aperture 9 and that a relatively small portion of the electronic discharge tube 11 is located above such water discharge aperture 9. The reason for this disposition of the electronic discharge tube 11 will be presently described.

In the operation of the above described form of the invention, air under sufficient pressure is supplied through the airline 5 to the airlift type pump 15 and such pump draws water from the tank 18 through the sand or other inorganic filter media 14, false bottom 16 and passages therebeneath to the pump 15 from which the same is discharged through the discharge tube 13 into the treating chamber 12 and the water is returned to the tank 18 through the discharge aperture 9 in the wall of the treating chamber 12. It is assumed, that the electronic discharge tube 11 is energized by a proper supply of electrical energy thereto and this tube is of such design, that the portion thereof immersed in the water treating chamber 12 will radiate germicidal energy at a wave length of approximately 2537 Angstrom units to destroy the waterborne germ life in the water flowing through the treating chamber 12. It is to be understood, that a certain proportion of the germ life in the water in the tank 18 will be retained in the filter media 14, but as this germ life multiplies, a large proportion thereof will become waterborne and pass through the filter media and false bottom 16 and therefrom into the treating chamber 12 where the same will be destroyed by the germicidal energy radiated from the electronic discharge tube 11.

Since, odorous gases are frequently generated in the water of an aquarium by decomposition of decaying plant or animal life, it is desirable to eliminate or deodorize such gases and for this purpose, the portion of the electronic discharge tube 11 above the water discharge aperture 9 in the wall of the treating chamber 12, or in other words, in the portion of the electronic discharge tube 11 above the water level in the treating chamber 12 is so designed as to radiate energy at a wave length of approximately 1849 Angstrom units which will produce ozone to sterilize, oxidize and deodorize the gases released from the water in the treating chamber 12. Consequently the single ultraviolet energy source provided by the electronic discharge tube 11 operates to both provide germicidal energy at an optimum wave length which will destroy water-borne bacteria and other germinal life in the treating chamber 12 and, at the same time, will provide ozone to sterilize, oxidize and deodorize gases released from the water in such treating chamber 12. Since the air exhausted from pump 15 passes upwardly through the discharge tube 13 and treating chamber 12 in the form of air bubbles in the water flowing therethrough, this will operate to agitate the water and promote release of gases therefrom.

As will be seen from the above, this form of the invention serves to maintain a biological and germinal balance in the body of water in the tank 18 substantially constant by destroying the excessive water-borne germinal life circulated through a treating chamber and by reason of the fact, that the chamber is shielded to prevent passage of germicidal radiation, there is no general treatment of the water in the tank, but only treatment of the water flowing through the treating chamber. Since, the flow of such water may be regulated by the supply of air to the pump 15, obviously, the degree of germicidal radiation treatment may be regulated and a biological and germinal balance maintained at a desirable level. By the unique and novel structure of the invention, there is also provided a sufficient quantity of ozone to sterilize, oxidize and deodorize gases released from the water circulating through the treating chamber.

With particular reference to Fig. 2, there is shown a slightly modified form of treating apparatus which is similar to the form described above, but varies therefrom in certain respects and there is shown a tank or aquarium 18a in which there is provided a body of water having an upper level indicated by the line 10a and a frame 8a is provided at the upper edge of the tank 18a.

A mechanical filter is provided in the form of sand or other inorganic filter media received in a container 14d suspended in the tank 18a and the container 14d is provided with water inlet openings 14e which may be disposed in the bottom thereof, or any other desired location. Connected to the upper end or discharge outlet of the container 14d is an airlift type pump 15a, but, of course, if desired, any other suitable type of pump may be employed. The pump 15a is supplied with air through an airline 5a and the flow of such air may be controlled by a valve as indicated.

Connected to the discharge outlet of the pump 15a is a tube 13a which in turn is connected to a water treating chamber 12a partially immersed in the water in the tank 18a and a water discharge aperture 9a is provided in the sidewall of the treating chamber 12a and it is to be noted, that the water discharge aperture 9a is disposed at or slightly above the waterline 10a in the tank 18a.

A suitable fitting 7a is secured to the upper end of the treating chamber 12a and this fitting 7a serves to suspend within the chamber 12a an electronic discharge tube 11a which may be U-shaped and provides a source of germicidal energy. An electrical connector 6a is connected to the electronic discharge tube 11a and serves to provide electrical energy thereto.

The operation of this form of the invention is identical with that described above in connection with Fig. 1, except that, of course, water is circulated by the pump 15a through the inlet openings 14e in the container 14d and through the sand or other inorganic filter media 14a to the pump 15a and thereafter to the treating chamber 12a where the same is subjected to germicidal radiation from the electronic discharge tube 11a, after which the treated water is returned to the tank 18a through the water discharge aperture 9a. As before, ozone is generated by radiation from the upper portion of the electronic discharge tube 11a situated above the water level in the treating chamber 12a and thereby the gases released from the water in the chamber 12a are sterilized, oxidized and deodorized.

With particular reference to Fig. 3, there is shown a modified form of treating chamber and germicidal energy source and as described above, there is shown a tank or aquarium 18b to contain a static body of water having an upper water level indicated by the line 10b. Disposed in the tank 18b adjacent the bottom thereof is a perforated false bottom 16b and this serves to support a bed of sand or other filter media 14b which provides a mechanical filter for water flowing therethrough. Disposed beneath the false bottom 16b are passages which communicate with the intake of an airlift type pump 15b which may be supplied with air under pressure through an airline, 5b, the flow of which air may be controlled by a valve as shown.

A bracket 17b is suspended from the upper edge of the tank 18b and bracket 17b is provided on each end thereof, with an electronic discharge tube socket or receptacle 6b which serve to receive and support an electronic discharge tube 11b. This electronic discharge tube 11b provides a source of germicidal energy. Received on each end of the electronic discharge tube 11b is a tapered collar 7b which are received in the opposite ends of an elongated tubular member 12b providing a water treating chamber and the collars 7b provide a fluid-tight seal between the ends of the tubular member 12b and the electronic discharge tube 11b. It is to be noted, that the electronic discharge tube 11b is concentrically spaced from the outer wall of the elongated tubular member 12b, thereby providing a space therebetween and communicating with this space at one end, is a water inlet connected to a water discharge tube 13b from the pump 15b and at the opposite end of the tubular member 12b to the tank 18b.

The operation of this form of the invention is identical with that described above in that, water is circulated from the tank 18b through the filter media 14b and to the pump 15b where the same is discharged through the tube 13b to the inlet of the tubular 12b and through the chamber formed by such tubular member and around the electronic discharge tube 11b to the outlet 9b where the treated water is returned to the tank 18b. During passage through the tubular member 12b, the water is, of course, subjected to germicidal radiation provided by the electronic discharge tube 11b at an optimum wave length which will destroy the water-borne germ life present in the water flowing through the chamber provided by the tubular member 12b.

In the form of the invention shown in Fig. 3, since, the electronic discharge tube 11b is entirely immersed in water, there will be no radiation from the same which will produce ozone and since, it is sometimes desirable to provide ozone in order to sterilize, oxidize and deodorize gases released from the water in the tank 18b, there may be provided, as shown in Fig. 4, an ozone generator which may be connected directly to the air supply of the airlift pump of the form of the invention shown in Fig. 3, or in fact, if desired, this ozone generator could be connected in the air supply to the pumps of any of the other forms of the invention or other conventional apparatus not shown, or claimed in this application. As shown in Fig. 4, a bracket 17c serves to support electronic discharge tube sockets or receptacles 6c which are received on the opposite ends of an electronic discharge tube 11c and received on each end of such electronic discharge tube are tapered collars 7c which engage in the opposite ends of a tubular member 12c providing an air-tight seal therebetween.

The electronic discharge tube 11c is arranged concentrically of and in spaced relation to the sidewall of the elongated tubular member 12c and at one end of such tubular member there may be provided an air inlet 5c with the flow of air therethrough being controlled by a valve as shown, and adjacent the opposite end of the elongated tubular member 12c there may be provided an air outlet tube 5d which may be connected to the air supply tubes of any of the forms of the invention described above. Air flowing through the elongated tubular member 12c will be subjected to ultraviolet radiation from the electronic discharge tube 11c at such a wave length as to produce ozone $O_3$ therein and, of course, this ozone will be carried by the air stream to the airlift pumps of the forms of the invention described above and will operate to oxidize, sterilize and deodorize gases released from the water circulated by such pumps.

It will thus be seen that by this invention there has been provided a relatively simple, yet highly efficient method and apparatus for treating static bodies of water in order to maintain a biological and germinal balance substantially constant, in order to promote fish and other forms of aquatic life therein and, at the same time, to provide for conversion of waste or other foreign matter by bacterial action and the apparatus of this invention also simultaneously operates to provide ozone for sterilizing, oxidizing and deodorizing gases released from the water as the same is circulated through the apparatus. The apparatus of this invention may be conveniently installed in existing aquariums without modification thereof and since, the same may be constructed from readily available materials and without requiring highly skilled workmanship, the same may be produced in large quantities and sold in a highly competitive market.

Four configurations of germicidal sources and biological filter elements are shown in Figs. 1, 2, 3 and 4. Other configurations may be employed to vary the lethal power and air/water capacity by modification of their physical size and auxiliary components, without altering the intent and purpose of this invention.

The biological filter per se, may be used with, or without an auxiliary mechanical filter and with any conventional filter system normally used in an aquarium without materially affecting its characteristics as a lethal biological filter. It is also to be noted, that the mechanical filter may be replaced by a suitable sump wherein germ life and animal waste will tend to collect.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A method of treating a static body of water to maintain a substantially constant biological and germinal balance therein and to deodorize gases generated in the water, said method comprising circulating said water at a controlled rate through an inorganic filter media immersed in the water thereby retaining a portion of the germ life in said filter for conversion of foreign matter in said water by germinal action, circulating the water and water-borne germ life passing through said filter through a chamber, providing a source of germicidal energy in said chamber and shielding said chamber to prevent the passage of germicidal radiation therefrom, treating the water passing through said chamber with germicidal energy from said source at a wave length of approximately 2537 Angstrom units to destroy the water-borne germ life, discharging treated water from said chamber into said body of water and treating gases released from the water passing through said chamber with radiant energy from said source at a wave length of approximately 1849 Angstrom units to produce ozone, thereby sterilizing, oxidizing and deodorizing said gases.

2. A method as defined in claim 1 in which the water passing through said chamber is agitated to promote the release of gases therefrom.

3. A method of treating a static body of water to maintain a substantially constant biological and germinal balance therein and to deodorize gases generated in the water, said method comprising circulating said water at a controlled rate through a filter immersed in the water thereby retaining a portion of the germ life in said filter for conversion of animal waste and other foreign matter in said water by germinal action, circulating the water and water-borne germ life passing through said filter through a chamber, providing a source of germicidal energy in said chamber and shielding said chamber to prevent the passage of germicidal radiation therefrom, treating the water passing through said chamber with germicidal energy from said source at a wave length of approximately 2537 Angstrom units to destroy the water-borne germ life, discharging treated water from said chamber into said body of water and treating gases released from the water passing through said chamber with radiant energy from said source at a wave length of approximately 1849 Angstrom units to produce ozone, thereby sterilizing, oxidizing and deodorizing such gases.

4. Apparatus for treating a static body of water to maintain a substantially constant biological and germinal balance therein and to deodorize gases generated in the water, said apparatus comprising an inorganic filter media immersed in the water, an airlift type pump immersed in said body of water for circulating water through said filter at a controlled rate thereby retaining a portion of the germ life in said filter for conversion of foreign matter in said water by germinal action, a treating chamber connected to the discharge outlet of said pump, an outlet for discharging treated water from said chamber into said body of water and for maintaining the water level in said chamber substantially constant, a source of germicidal energy comprising an electronic discharge tube partially immersed in the water in said chamber, the portion of said tube immersed in water radiating germicidal energy at a wave length of approximately 2537 Angstrom units to destroy the water-borne germ life and the portion of said tube above the water radiating energy at a wave length of approximately 1849 Angstrom units to produce ozone to sterilize, oxidize and deodorize gases released from the water in said chamber and means shielding said chamber to prevent the passage of germicidal radiation therefrom.

5. Apparatus for treating a static body of water to maintain a substantially constant biological and germinal balance therein and to deodorize gases generated in the water, said apparatus comprising a filter immersed in the water, an airlift type pump immersed in said body of water for circulating water through said filter at a controlled rate thereby retaining a portion of the germ life in said filter for conversion of foreign matter in said water by germinal action, a treating chamber connected to the discharge outlet of said pump, an outlet for discharging treated water from said chamber into said body of water and for maintaining the water level in said chamber substantially constant, a source of germicidal energy comprising an electronic discharge tube partially immersed in the water in said chamber, the portion of said tube immersed in water radiating germicidal energy at a wave length of approximately 2537 Angstrom units to destroy the water-borne germ life and the portion of said tube above the water radiating energy at a wave length of approximately 1849 Angstrom units to produce ozone to sterilize, oxidize and deodorize gases released from the water in said chamber and means shielding said chamber to prevent the passage of germicidal radiation therefrom.

6. Apparatus as defined in claim 5 in which the shielding means comprises the material of said chamber.

7. Apparatus as defined in claim 4 in which said filter comprises a bed of sand adjacent to the bottom of said body of water and passages beneath said bed connected to the intake of said pump.

8. Apparatus as defined in claim 4 in which said filter comprises a container having inorganic filter media therein and suspended in said body of water, water inlet openings in said container and a water outlet therein connected to the intake of said pump.

9. Apparatus for treating a static body of water to maintain a substantially constant biological and germinal balance therein and to deodorize gases generated in the water, said apparatus comprising a filter immersed in the water, a pump for circulating water through said filter at a controlled rate thereby retaining a portion of the germinal life in said filter for conversion of foreign matter in said water by germinal action, a treating chamber connected to the discharge outlet of said pump, an outlet for discharging treated water from said chamber into said body of water and for maintaining the water level in said chamber substantially constant, a source of germicidal energy comprising an electronic discharge tube partially immersed in the water of said chamber, the portion of said tube immersed in water radiating germicidal energy at a wave length of approximately 2537 Angstrom units to destroy the water-borne germ life and a portion of said tube above the water radiating ultraviolet energy at a wave length of approximately 1849 Angstrom units to produce ozone to sterilize, oxidize, and deodorize gases released from the water in said chamber.

References Cited in the file of this patent

UNITED STATES PATENTS

| 897,039 | Vogelsang | Aug. 25, 1908 |
| 2,070,307 | Nicholls | Feb. 9, 1937 |
| 2,537,530 | Hofman | Jan. 9, 1951 |
| 2,667,584 | Rhodes | Jan. 26, 1954 |
| 2,769,779 | Vansteenkiste et al. | Nov. 6, 1956 |
| 2,782,161 | Willinger et al. | Feb. 19, 1957 |

FOREIGN PATENTS

| 398,312 | Great Britain | Sept. 14, 1933 |